(12) United States Patent
Payne et al.

(10) Patent No.: US 8,430,665 B2
(45) Date of Patent: Apr. 30, 2013

(54) COMBUSTION SYSTEMS AND PROCESSES FOR BURNING FOSSIL FUEL WITH REDUCED NITROGEN OXIDE EMISSIONS

(75) Inventors: Roy Payne, Mission Viejo, CA (US); Larry William Swanson, Laguna Hills, CA (US); David Kelly Moyeda, Laguna Hills, CA (US); Antonio Marquez, San Dimas, CA (US)

(73) Assignee: General Electric Company, Schenectady, NY (US)

( * ) Notice: Subject to any disclaimer, the term of this patent is extended or adjusted under 35 U.S.C. 154(b) by 707 days.

(21) Appl. No.: 12/036,739

(22) Filed: Feb. 25, 2008

(65) Prior Publication Data

US 2009/0214988 A1    Aug. 27, 2009

(51) Int. Cl.
*F23D 1/02* (2006.01)
*F23N 5/18* (2006.01)

(52) U.S. Cl.
USPC .......... 431/8; 431/115; 431/10; 431/187; 110/345; 110/210; 110/203; 110/302

(58) Field of Classification Search .......... 431/8, 115, 431/2, 10, 187; 110/345, 211–213, 203, 110/302
See application file for complete search history.

(56) References Cited

U.S. PATENT DOCUMENTS

| | | | |
|---|---|---|---|
| 4,087,963 A | | 5/1978 | Schirmer |
| 4,488,866 A | | 12/1984 | Schirmer et al. |
| 4,519,993 A | | 5/1985 | McGill et al. |
| 4,655,148 A | * | 4/1987 | Winship .......... 110/347 |
| 4,940,004 A | * | 7/1990 | Jansen .......... 110/182.5 |
| 5,002,483 A | | 3/1991 | Becker |
| 5,315,939 A | * | 5/1994 | Rini et al. .......... 110/264 |
| 5,626,085 A | * | 5/1997 | Donais et al. .......... 110/188 |
| 6,085,674 A | * | 7/2000 | Ashworth .......... 110/347 |
| 6,258,336 B1 | | 7/2001 | Breen et al. |
| 6,325,002 B1 | | 12/2001 | Ashworth |

(Continued)

FOREIGN PATENT DOCUMENTS

| | | |
|---|---|---|
| DE | 19706988 A1 | 11/1997 |
| EP | 0073265 A1 | 9/1983 |

(Continued)

OTHER PUBLICATIONS

Richard T. Waibel, PhD., et al. "Low NOx Burner Applications in Process Heaters for Refineries and Chemical Plants", XXXVII Convencion Nacional IMIQ, Coatzacoalcos, Vera Cruz, Sep. 10-12, 1997, John Zink Company, LLC.

(Continued)

*Primary Examiner* — Steven B McAllister
*Assistant Examiner* — Nikhil Mashruwala
(74) *Attorney, Agent, or Firm* — Armstrong Teasdale LLP

(57) ABSTRACT

Combustion systems having reduced nitrogen oxide emissions and methods of using the same are disclosed herein. In one embodiment, a combustion system is provided. The combustion system includes a combustion zone, which includes a burner for converting a fuel, under fuel rich conditions, to a flue gas. An intermediate staged air inlet is downstream from the combustion zone, for supplying intermediate staged air to the flue gas and producing fuel lean conditions. A reburn zone is downstream from the intermediate staged air inlet for receiving the flue gas. A process for using the combustion system and a method of reducing $NO_X$ flowing into the reburn zone of a combustion system are also described herein.

8 Claims, 3 Drawing Sheets

U.S. PATENT DOCUMENTS

| | | | |
|---|---|---|---|
| 6,325,003 B1 | 12/2001 | Ashworth et al. | |
| 6,453,830 B1 | 9/2002 | Zauderer | |
| 6,599,118 B2 | 7/2003 | Pisupati | |
| 6,790,030 B2 | 9/2004 | Fischer et al. | |
| 6,957,955 B2 | 10/2005 | Kobayashi et al. | |
| 7,168,947 B2 | 1/2007 | Zamansky et al. | |
| 8,302,545 B2* | 11/2012 | Swanson et al. | 110/297 |
| 2004/0191914 A1* | 9/2004 | Widmer et al. | 436/55 |
| 2008/0083356 A1* | 4/2008 | Payne et al. | 110/297 |
| 2010/0203461 A1* | 8/2010 | Maly et al. | 431/9 |

FOREIGN PATENT DOCUMENTS

| | | |
|---|---|---|
| GB | 2116308 A | 9/1983 |
| WO | 99/08045 | 2/1999 |
| WO | 2005/118113 | 12/2005 |

OTHER PUBLICATIONS

James Tobin, "Reburn & Advanced NOx Control Technologies", APEC Clean Fossil ENergy Seminar, Seoul, Korea, Dec. 9-12, 2003.

David R. Thompson et al., "Oxygen Enhanced Combustion for NOx Control", Final Report, Prepared for U.S. Department of Energy, Mar. 2004, Praxair, Inc., Tonawanda, NY.

Foster Wheeler Energy Coproration, "Low NOx Firing Systems for Tangential-fired Units", Perryville Corporate Park, Clinton, NJ, Atlanta, GA, Chicago, IL.

Intellectual Property Office, Foreign Search Report related to Application No. GB0902240.1 dated Jun. 12, 2009.

* cited by examiner

COMBUSTION SYSTEMS AND PROCESSES FOR BURNING FOSSIL FUEL WITH REDUCED NITROGEN OXIDE EMISSIONS

BACKGROUND OF THE INVENTION

This disclosure relates generally to combustion systems for power plants, and more particularly to combustions systems having reduced nitrogen oxide emissions.

During a typical combustion process within a furnace or boiler, for example, a flow of combustion gas, or flue gas, is produced. Known combustion gases contain combustion products including, but not limited to, carbon, carbon dioxide, carbon monoxide, water, hydrogen, nitrogen, sulfur dioxide, chlorine, and/or mercury generated as a result of combusting fuels. Combustion gases also contain nitrogen oxides ($NO_X$), usually in the form of a combination of nitric oxide (NO) and nitrogen dioxide ($NO_2$). Various technologies have been applied to combustion systems to minimize the emissions of $NO_X$, however, further improvements are needed.

FIG. 1 shows a prior art combustion system 100. As shown, the prior art combustion system 100 includes a fuel lean main combustion zone 120, a reburn zone 124, and a burnout zone 126 stacked upwardly from the base of the prior art combustion system 100. These different zones of the prior art combustion system 100 are enclosed within a housing 110. Within the main combustion zone 120, the fuel undergoes combustion and forms a flue gas that flows upwardly to the reburn zone 124. As used herein, the term "flue gas" refers to the products of combustion, including but not limited to, carbon, carbon dioxide, carbon monoxide, water, hydrogen, nitrogen, sulfur dioxide, chlorine, NO, $NO_2$, and/or mercury generated as a result of combusting fuels. Flyash is excluded from flue gas when computing residence times in the combustion system.

The amounts of fuel and air supplied to the main combustion zone 120 of the prior art combustion system 100 are selected to achieve fuel lean conditions therein. The term "fuel lean," as used herein, refers to a condition having less than a stoichiometric amount of fuel available for reaction with the $O_2$ in the air, i.e., a stoichiometric ratio (SR) of greater than about 1.0. The exact SR in the main combustion zone 120 of the prior art combustion system 100 varies depending on the fuel type and combustion system design, but generally ranges from about 1.05 to about 1.10. Flue gas produced in the main combustion zone 120 then flows to the reburn zone 124 and fuel is added to the flue gas through one or more reburn inlets 134. The amount of fuel added through the reburn inlets 134 is effective to produce fuel rich conditions in the reburn zone 124. The term "fuel rich," as used herein, refers to a condition having more than a stoichiometric amount of fuel available for reaction with the $O_2$ in the air, i.e., a SR of less than about 1.0. The exact SR in the reburn zone 124 of the prior art combustion system 100 varies depending on the fuel type and combustion system design but generally ranges from about 0.85 to about 0.95.

BRIEF DESCRIPTION OF THE INVENTION

Combustion systems having reduced nitrogen oxide emissions and methods of using the same are disclosed herein. In one embodiment, a combustion system is provided. The combustion system includes a combustion zone that includes a burner for converting a fuel, under fuel rich conditions, to a flue gas. An intermediate staged air (ISA) inlet is downstream from the combustion zone, for supplying intermediate staged air to the flue gas and producing fuel lean conditions. A reburn zone is downstream from the intermediate staged air inlet for receiving the flue gas.

In another embodiment, a process for using a combustion system is provided. The process includes supplying a fuel and air under fuel rich conditions to a combustion zone, which has a burner, to form a flue gas. Intermediate staged air is supplied to the flue gas through an intermediate staged air inlet downstream of the combustion zone to produce fuel lean conditions. The flue gas is then channeled to a reburn zone downstream from the intermediate staged air inlet.

In another embodiment, a method of reducing $NO_X$ flowing into the reburn zone of a combustion system. The method includes supplying a fuel and air under fuel rich conditions to a combustion zone that includes a burner, to form a flue gas. Intermediate staged air is then supplied to the flue gas through an intermediate staged air inlet downstream of the combustion zone to produce fuel lean conditions. The flue gas is then channeled to a reburn zone downstream from the intermediate staged air inlet.

BRIEF DESCRIPTION OF THE DRAWING

These and other features, aspects, and advantages of the exemplary combustion system will be better understood when the following detailed description is read with reference to the accompanying drawing, in which.

DETAILED DESCRIPTION OF THE INVENTION

Figure 2:
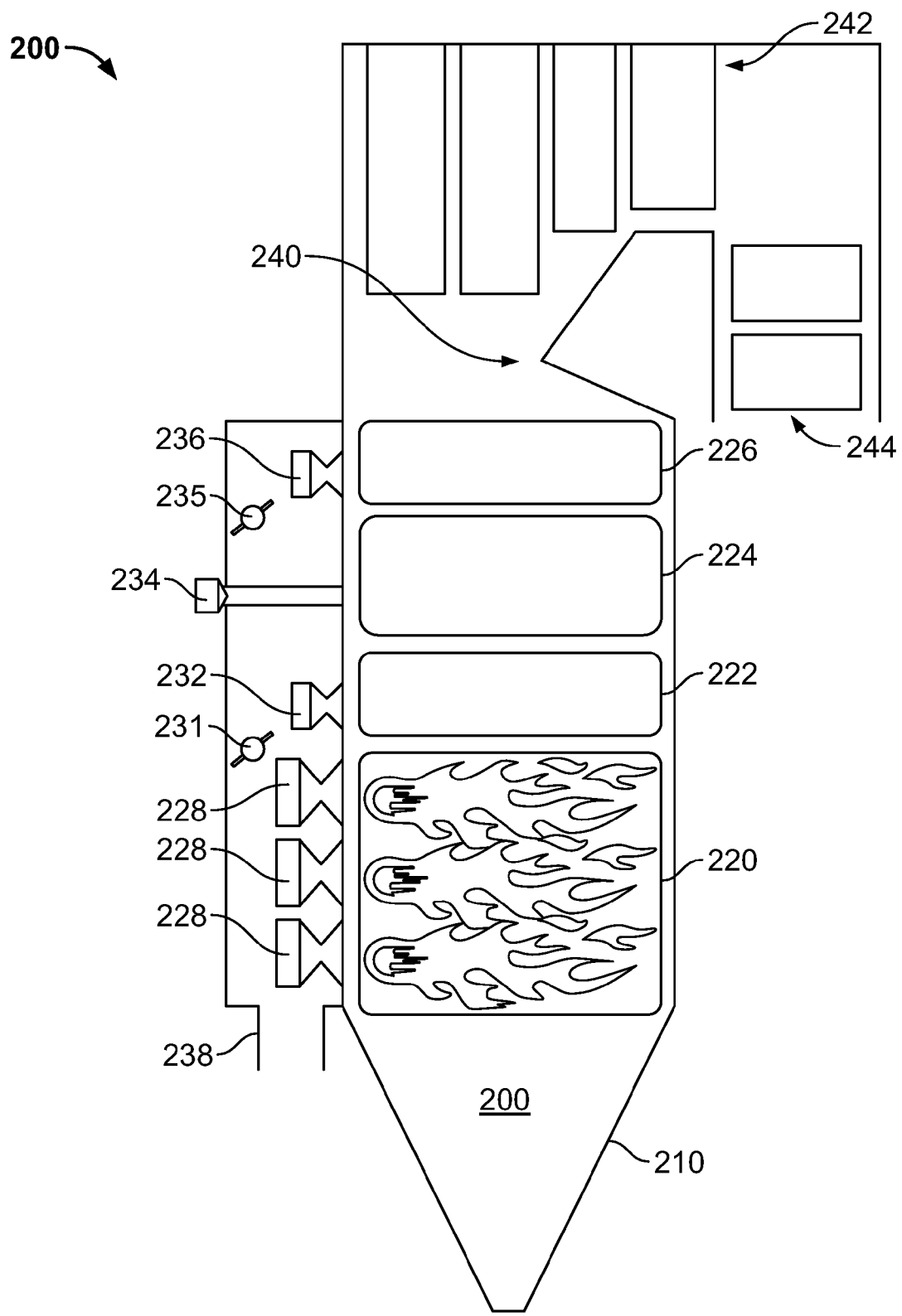
FIG. 2 is a schematic diagram showing a side, cross-sectional view of an embodiment of a combustion system having reduced levels of nitrogen oxides.

FIG. 2 shows an exemplary embodiment of the combustion system 200 that can be used for various applications such as in a fossil-fuel fired boiler, furnace, engine, incinerator, etc. One particularly suitable application of combustion system 200 is as the source of power generation in a power plant. The main combustion zone 220 is equipped with one or more main burners (not shown) such as specially designed burners for producing low levels of nitrogen oxides ($NO_X$). In one embodiment, the main combustion zone 220 includes two or more burners arranged in two or more rows. Fuel and primary air are supplied together to the main combustion zone 220 through one or more inlets 228. Secondary air is also generally supplied to the main combustion zone 220 through inlets 228. The amounts of fuel and air supplied to the main combustion zone 220 are selected to achieve fuel rich conditions therein. The exact SR in the main combustion zone 220 will vary depending on the fuel type and furnace design, but will be less than about 1.0. In one embodiment, the SR in the main combustion zone 220 is about 0.90 to about 0.95. Examples of suitable fuels for use in the main combustion zone 220 include, but are not limited to including, fossil fuels, such as lignite coal, bituminous coal, sub-bituminous coal, anthracite coal, oil, or gas, such as natural gas or gasified coal, various types of biomass, and combinations including at least one of the foregoing fuels. Any suitable form of fuel can be supplied to the main combustion zone 220, including pulverized coal that is ground using a powdered coal mill. Within the main combustion zone 220, the fuel undergoes combustion and forms a flue gas that flows upwardly toward the intermediate staged air zone 222.

The flue gas produced in the main combustion zone 220 flows to the intermediate staged air (ISA) zone 222. Air is added to the flue gas in this zone through one or more intermediate staged air inlets 232. The amount of ISA supplied to zone 222 is effective to produce fuel lean conditions, i.e., SR of greater than about 1.0. In one embodiment, sufficient ISA is supplied to zone 222 to produce a SR of about 1.05 to about 1.10. Flow into the ISA inlet 232 may be regulated by an ISA damper 231.

In one embodiment, the ISA inlet 232 is a burner out of service (BOOS) through which cooling air is injected. In this way, an existing furnace may be adapted to incorporate ISA by running cooling air through the existing top row of burners, making them the ISA inlets 232. This has a minimal cost impact and avoids additional wall penetrations in the furnace of the combustion system 200.

In another embodiment, the existing burners in the top row of the main combustion zone 220 are replaced with injectors specifically designed to inject ISA. In this way the velocity and mixing of the ISA in the ISA zone 222 may be better optimized for the system, but new furnace wall penetrations are not required. Alternatively, the existing burners in the top row of the main combustion zone 220 are blocked off and new injectors specifically design to inject ISA are placed at an elevation below, equal to, or above the top burner row. This does require additional wall penetrations for the ISA inlets 232. In another embodiment, the ISA inlet 232 is above (downstream) of the upper burner row of the main combustion zone 220. This enables the use of all of the existing burners in the main combustion zone 220, but does require additional wall penetrations for the ISA inlets 232.

The ISA supplied through the ISA inlet 232 may be in the form of cool ambient air, heated air, or both cool ambient air and heated air, with heated air being preferred. In one embodiment, the ISA is boosted such that the ISA is supplied at a relatively higher pressure. This may be accomplished using one or more rotating booster fans. The boosting of the ISA can achieve improved levels of air jet penetration and mixing in the ISA zone 222.

The fuel-lean flue gas then enters the reburn zone 224 and fuel is added to the flue gas through one or more reburn inlets 234. The fuel is typically accompanied by carrier gas. The carrier gas may be carrier air, boosted flue gas recirculation (FGR), or any other appropriate gas for the specific fuel and furnace design. The amount of fuel added through the reburn inlets 234 is effective to produce fuel rich conditions in the reburn zone 224. The exact SR in the reburn zone 224 of the combustion system 200 varies depending on the fuel type and combustion system design but generally ranges from about 0.85 to about 0.95.

The flue gas formed in the reburn zone 224 then proceeds through the combustion system 200 and is subjected to optional operations and treatments. In one embodiment the flue gas formed in the reburn zone 224 flows upwardly to the burnout zone 226, which is downstream from the reburn zone 224. Overfire air (OFA), also known as separated overfire air (SOFA), is supplied to the burnout zone 226 through inlet 236. OFA flow through inlet 236 may be regulated by an OFA damper 235. The OFA restores the system to overall fuel lean conditions, i.e., SR of greater than about 1.0. The exact SR varies depending on the fuel type and furnace design. In one embodiment, the SR in the burnout zone 226 is about 1.15 to about 1.3. The OFA can be added to the burnout zone 226 at a relatively higher pressure through inlet 236, such as with boosted overfire air (BOFA). This may be accomplished using one or more rotating booster fans. The BOFA can be in the form of cool ambient air, heated air, or both cool ambient air and heated air, with heated air being preferred. The introduction of the BOFA can achieve desired levels of air jet penetration and mixing in the burnout zone 226.

Air may be fed to the various stages in the combustion system 200 from a variety of sources. In one embodiment, a windbox supplies secondary air to the main combustion zone inlets 228, ISA to the ISA inlets 232, and/or OFA to the OFA inlets 236 through ducting 238. In another embodiment, air is delivered to one or more inlets 228, 232, and 236 through separate ducting (not shown). Control of the flow to the various inlets may be linked, or may be independent. The source of the air and the configuration of the ducting is not critical to the combustion system 200 and may be tailored to suit the particular furnace design.

The flue gas in the burnout zone 226 passes downstream to an outlet 244 where the flue exits the combustion system 200. As the flue gas passes to outlet 244, the flue gas flows past the tip of the boiler nose 240 and can flow through one or more heat exchangers 242 to serve as a heat source.

The residence time of the substances flowing through various regions of the combustion system 200 varies depending on fuel and air flow rates. As used herein, the term "residence time" refers to the average time the flue gas spends in a defined region of the furnace. Operation of the exemplary furnace is conducted such that there is sufficient residence time to enable conversion of the $NO_X$ to take place. The exact residence time required depends on the furnace design, primary fuel type, and/or reburn fuel type. In one embodiment, a residence time of flue gas in a region of the combustion system 200 between a centerline of the intermediate staged air inlet 232 and a centerline of the reburn inlet 234 is about 100 to about 400 milliseconds. In an alternative embodiment, a residence time of flue gas in a region of the combustion system 200 between the centerline of the reburn inlet 234 and a centerline of the overfire air inlet 236 is about 300 to about 1000 milliseconds. In general, fuels that devolatilize and mix quickly require relatively low average residence times. In another alternative embodiment, a residence time of the flue gas in a region of the combustion system 200 between the centerline of the OFA inlet 236 and the tip of the boiler nose 240 is greater than about 300 milliseconds. In still another alternative embodiment, a residence time of the flue gas in a region of the combustion system 200 between a centerline of a top burner row and the centerline of the tip of the boiler nose 240 (i.e., the total residence time of the combustion system) is greater than about 1,300 milliseconds. As used herein, the term "centerline" refers to an imaginary line running through the middle of an object.

The use of intermediate staged air in the exemplary combustion system 200 enables the main combustion zone 220 to operate at fuel rich conditions. This reduces the initial $NO_X$ flowing into the reburn zone 224 to improve overall $NO_X$ emissions by, for example, about 10% to about 25%, as compared to reburn without intermediate staged air. In at least some known combustion system, both air and fuel staging usually have the unwanted side effect of increasing the emissions of CO and unburned carbon in fly ash as measured by loss-on-ignition (LOI). In the exemplary embodiment, the use of ISA provides additional flexibility and control of CO and LOI while maintaining low $NO_X$ levels. The use of ISA combined with BOFA can also help restore the CO and unburned carbon emissions to more acceptable levels by improving the penetration of air into, and mixing with, the combustion gas. This type of integrated technology can reduce $NO_X$ emissions to less than or equal to about 200 milligram/Newton-meters cubed ($mg/Nm^3$) at about 6% $O_2$ dry, or about 0.163 pound/million Btu (lb/MMBtu), thus meeting the $NO_X$ emissions requirement of the European Union Large Combustion Plant Directive (LCPD), Phase 2. The combustion system 200 also can maintain the LOI at a sufficiently low level to allow the fly ash waste to be sold in Europe. This technology also is less expensive than selective catalytic reduction (SCR) technology. The combustion system 200 is therefore a low cost alternative to the SCR technology.

In additional embodiments, the combustion system described above can be combined with a selective non-catalytic reduction system (SNCR) such as the SNCR systems described in U.S. Pat. No. 5,853,683. For example, a SNCR system can be disposed downstream from the combustion system. Combining the ISA, BOFA, and the SNCR technologies into one power generation unit can reduce NOx emissions to less than or equal to about 123 $mg/Nm^3$ at about 6% $O_2$ dry, or about 0.1 lb/MM Btu, which meets the requirements of the Clean Air Interstate Rule (CAIR) of the United States. As such, the combination of these technologies, in a layered $NO_X$ control approach, can provide effective reduction of $NO_X$ emissions with added flexibility in controlling CO and LOI.

The disclosure is further illustrated by the following non-limiting examples.

EXAMPLES

One embodiment of the exemplary combustion system was tested in a pre-existing wall-fired boiler. Since the upper furnace was quite large, the system was not optimized, rather the system was designed to work within existing constraints. A series of tests were performed in which bituminous coal was burned in the wall-fired boiler operating at its Maximum Continuous Rating load (MCR). There were originally four elevations of low $NO_X$ burners. The burners in the top row were taken out of service by turning off the fuel to them during reburn operation, such that they became burners out of service (BOOS). The BOOS were converted to ISA inlets by supplying secondary cooling air through them. The secondary air injected through the BOOS served as the ISA. The ISA flow rate remained at about 12% of the stoichiometric flow rate of the total air input into the system during the series of tests. No primary air flowed though the central coal pipe in the BOOS while they were being utilized as the ISA inlets. A series of tests were performed at various burner and reburn stoichiometric ratios. In these tests, coal over coal reburn was utilized.

Figure 1:
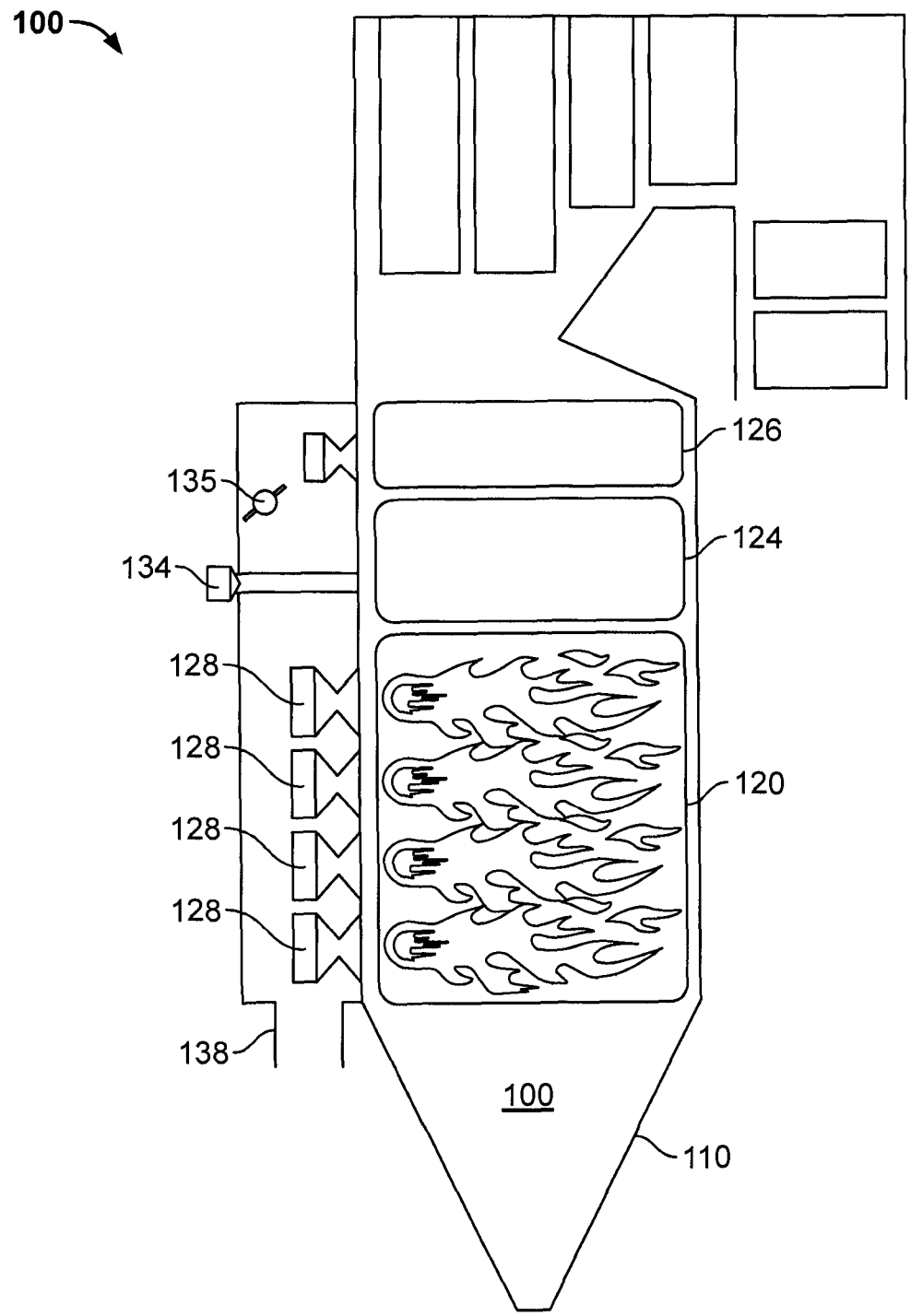
FIG. 1 is a schematic diagram showing a side, cross-sectional view of a prior art combustion system.
Figure 3:
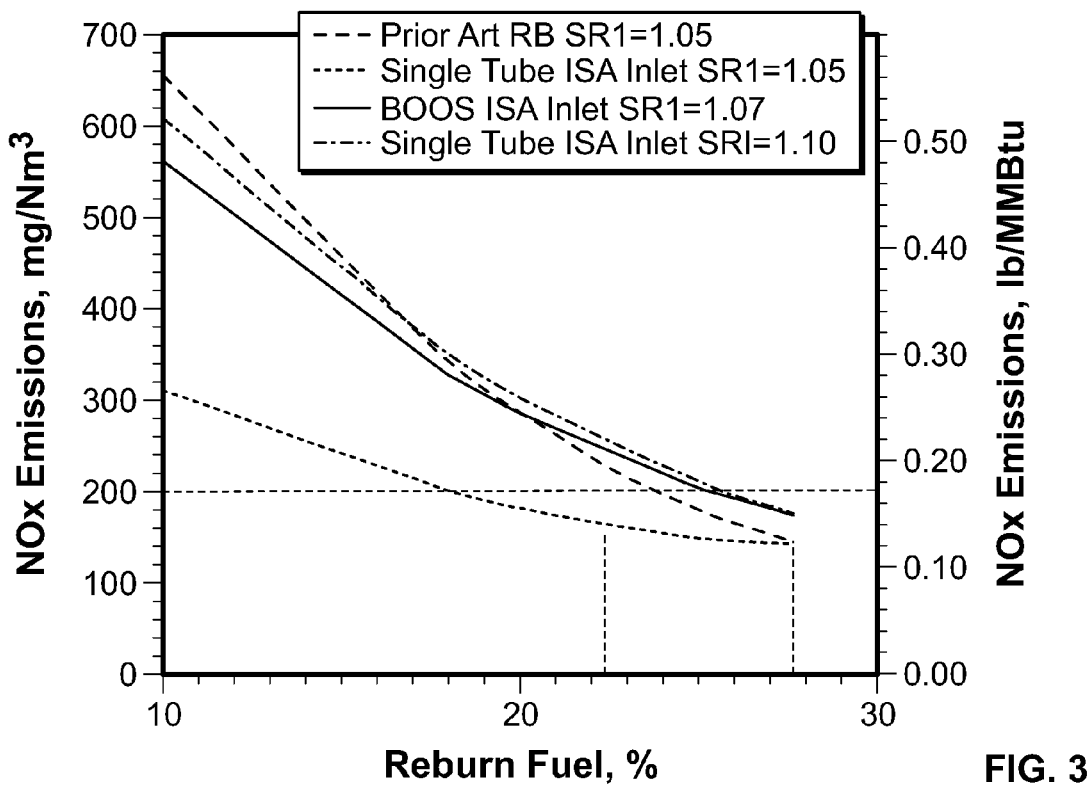
FIG. 3 graphically illustrates the basic $NO_X$ emissions curves generated by a coal over coal reburn model that was calibrated using field data, for a combustion system using traditional reburn (prior art) system, shown in FIG. 1, and for two embodiments of a combustion system shown in FIG. 2.

FIG. 3 shows a plot of projected $NO_X$ emissions as a function of the percent reburn fuel, with the stoichiometric ratio entering the reburn zone (SR1) as a curve characterization parameter. In all cases, the overall boiler stoichiometric ratio was held constant at about 1.15 and the ISA flow rate for the inventive cases was held constant at about 12% of the stoichiometric air flow rate. These curves were generated from a model that was calibrated using the field data generated in the tests described above. Emissions for four cases are presented. The first case is the prior art system 100 (shown in FIG. 1), without ISA (Prior Art RB SR1=1.05). The second case corresponds to an exemplary embodiment of the combustion system 200 (shown in FIG. 2) with cooling air flowing as ISA through the upper burner row taken out of service (BOOS ISA inlet SR1=1.07). The third and fourth cases correspond to alternative embodiments of the combustion system 200 in which the upper row burners were replaced by single-tube air injectors designed for improved mixing (Single tube ISA inlet SR1=1.05 and Single tube ISA inlet SR1=1.10).

All of the reburn system configurations shown were able to achieve $NO_X$ emissions below about 200 $mg/Nm^3$ at about 6% $O_2$ dry (0.163 lb/MMBtu) level. However, the exemplary system 200 with SR1=1.05 was able to reach $NO_X$ levels well below about 200 $mg/Nm^3$ at about 6% $O_2$ dry over a wide range of reburn fuel rates. This example shows that ISA in the exemplary combustion system 200 not only provides flexibility in controlling $NO_X$ emissions, but also has the potential of improving control over LOI and CO. This additional control over LOI and the drive toward process conditions that minimize total emissions ($NO_X$, LOI, CO) is highlighted in FIG. 4.

Figure 4:
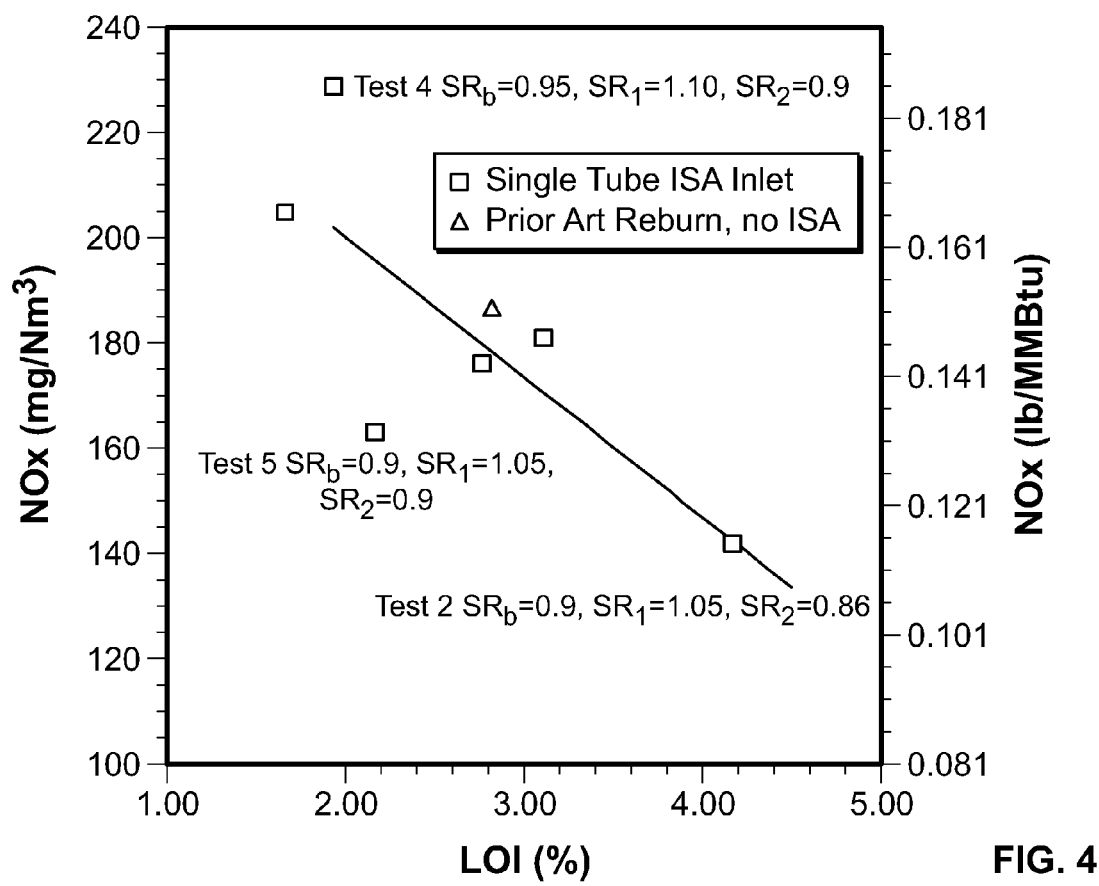
FIG. 4 graphically illustrates $NO_X$ emissions as a function of loss on ignition (LOI) for several simulated combustion system process conditions with the ISA flow rate held constant at twelve percent (12%) of the stoichiometric air flow rate.

Figure shows a plot of $NO_X$ emissions as a function of LOI for different reburn operating conditions for the single tube ISA inlet embodiment of the exemplary system 200 (shown in FIG. 2), compared with a reburn system of the prior art system 100 (shown in FIG. 1) that did not utilize ISA. The calibrated $NO_X$ model was used to determine $NO_X$ emissions whereas as a calibrated computational fluid dynamics (CFD) model was used to determine LOI emissions (percent in ash). Without any reburn or ISA, NOx emissions would be about 541 $mg/Nm^3$ at about 6% $O_2$ dry (0.440 lb/MMBtu) and LOI of about 1.86% (not shown). As shown in FIG. 4, the use of reburn enabled the best-case prior art system to yield NOx emissions of 187 $mg/Nm^3$ at 6% $O_2$ dry (0.152 lb/MMBtu) with LOI of about 2.82%. The exemplary system 200 using ISA was capable of significantly lower $NO_X$ emissions, such as with Test 2 at about 142 $mg/Nm^3$ at about 6% $O_2$ dry (0.115 lb/MMBtu), with its higher LOI of about 4.17%. Combined with ISA this example used deep fuel staging, which shifted fuel to a higher furnace elevation, leading to less overall carbon burnout residence time and thus, higher LOI. However, the exemplary system 200 using ISA was also capable of generating both low $NO_X$ emissions and low LOI, as shown in Test 5. This represented the best-case that was modeled, yielding $NO_X$ emissions of about 163 $mg/Nm^3$ at about 6% $O_2$ dry (0.133 lb/MMBtu) and LOI of about 2.17%. The exemplary system 200, using ISA, gave previously unattainable flexibility in the ability to control both LOI and $NO_X$ in the combustion system.

As used herein, the terms "a" and "an" do not denote a limitation of quantity, but rather denote the presence of at least one of the referenced items. Moreover, the endpoints of all ranges directed to the same component or property are inclusive of the endpoint and independently combinable (e.g., "about 5 wt % to about 20 wt %," is inclusive of the endpoints and all intermediate values of the ranges of "about 5 wt. % to about 20 wt %"). Reference throughout the specification to "one embodiment", "another embodiment", "an embodiment", and so forth means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. It is also to be understood that the disclosure is not limited by any theories described therein. Unless defined otherwise, technical and scientific terms used herein have the same meaning as is commonly understood by one of skill in the art to which this invention belongs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A process for using a combustion system, said process comprising:
   supplying a first injection of hydrocarbon fuel and an injection of primary air under fuel rich conditions to a combustion zone comprising a burner to form a flue gas;
   channeling the flue gas to an intermediate staged air zone that includes an intermediate staged air inlet downstream of the combustion zone;
   supplying intermediate staged air to the flue gas through the intermediate staged air inlet downstream of the combustion zone to produce fuel lean conditions within the intermediate staged air zone;
   regulating the flow of intermediate staged air into the intermediate staged air zone via at least one damper positioned between the combustion zone and the intermediate staged air inlet such that the stoichiometric ratio within the intermediate staged air zone is maintained at greater than 1; and
   channeling the flue gas to pass to a reburn zone downstream from the intermediate staged air inlet, such that said intermediate staged air zone is defined between said combustion zone and said reburn zone and receiving a second injection of hydrocarbon fuel for producing fuel rich conditions within said reburn zone
   channeling the flue gas downstream to a burnout zone downstream from the reburn zone, wherein the burnout zone receives an injection of overfire air and producing fuel lean conditions within the burnout zone.

2. The process of claim 1, wherein supplying intermediate staged air to the flue gas further comprises supplying intermediate staged air to the flue gas as boosted air.

3. The process of claim 1 further comprising supplying additional hydrocarbon fuel to the reburn zone through a reburn inlet, wherein a residence time of flue gas in a region of the combustion system between a centerline of the intermediate staged air inlet and a centerline of the reburn inlet is about 100 to about 400 milliseconds.

4. The process of claim 1 further comprising:
   supplying overfire air to the burnout zone through an overfire air inlet, wherein a residence time of the flue gas in a region of the combustion system between the centerline of the reburn inlet and a centerline of the overfire air inlet is about 300 to about 1000 milliseconds.

5. The process of claim 1 further comprising:
   supplying overfire air through an overfire air inlet to the burnout zone; and
   channeling the flue gas to flow through a tip of the boiler nose downstream from the burnout zone, wherein a residence time of the flue gas in a region of the combustion system between a centerline of the overfire air inlet and the tip of the boiler nose is greater than about 300 milliseconds.

6. The process of claim 1, wherein supplying a fuel and air under fuel rich conditions to a combustion zone further comprises supplying a fuel and air under fuel rich conditions to a combustion zone comprising two or more burners arranged in two or more rows, wherein the combustion system comprises a boiler nose tip through which the flue gas flows, and a residence time of the flue gas in a region of the combustion system between a centerline of a top burner row and a centerline of the boiler nose tip is greater than about 1,300 milliseconds.

7. The process of claim 1 further comprising combining the combustion system with a selective non-catalytic reduction system.

8. The process of claim 1 further comprising selecting the fuel from the group consisting of coal, oil, gas, biomass or a combination of these.

* * * * *